(12) United States Patent
Ishikawa

(10) Patent No.: US 11,000,933 B2
(45) Date of Patent: May 11, 2021

(54) ELECTRIC POWER TOOL

(71) Applicant: MAKITA CORPORATION, Anjo (JP)

(72) Inventor: Junya Ishikawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 93 days.

(21) Appl. No.: 16/114,530

(22) Filed: Aug. 28, 2018

(65) Prior Publication Data
US 2019/0070705 A1 Mar. 7, 2019

(30) Foreign Application Priority Data
Sep. 5, 2017 (JP) .............................. JP2017-170254

(51) Int. Cl.
H02K 7/14 (2006.01)
B25F 5/02 (2006.01)
B24B 23/02 (2006.01)
B24B 41/00 (2006.01)
B24B 23/03 (2006.01)
(Continued)

(52) U.S. Cl.
CPC ............ *B24B 23/028* (2013.01); *B24B 23/03* (2013.01); *B24B 27/0076* (2013.01); *B24B 41/007* (2013.01); *B24D 9/08* (2013.01); *B24D 13/14* (2013.01); *B24D 13/147* (2013.01); *B25F 5/008* (2013.01); *B25F 5/02* (2013.01); *B60S 3/06* (2013.01); *H01M 50/20* (2021.01); *H01M 2220/20* (2013.01); *H02K 7/145* (2013.01)

(58) Field of Classification Search
CPC .. H02K 7/14; H02K 7/145; B25F 5/02; B25F 5/008; B24B 23/028; B24B 23/03; B24B 27/0076; B24B 41/007; B24D 13/14; B24D 13/147; B24D 9/08
USPC ............................................ 310/50; 173/217
See application file for complete search history.

(56) References Cited

U.S. PATENT DOCUMENTS

2004/0224621 A1* 11/2004 Fraser ....................... B25F 5/02
                                                              451/359
2014/0174778 A1*  6/2014 Aoki ....................... B25D 17/04
                                                              173/170
(Continued)

FOREIGN PATENT DOCUMENTS

CN 104742096 A 7/2015
CN 104924279 A 9/2015
(Continued)

OTHER PUBLICATIONS

JP-2001225254-A (English Translation) (Year: 2001).*
(Continued)

*Primary Examiner* — Quyen P Leung
*Assistant Examiner* — Alexander Moraza
(74) *Attorney, Agent, or Firm* — Oliff PLC

(57) ABSTRACT

In an angle electric power tool 1 in which an output axis P intersects and is orthogonal to a motor axis J, a battery attachment portion 40 is provided to the rear of a grip 30 so as to extend in the rearward direction and a battery pack 50 is configured to be attached to an upper surface of said battery attachment portion 40. Because of this configuration, the battery pack 50 does not directly come into contact with a working surface W, thereby preventing flaws and scratches on the working surface W.

25 Claims, 14 Drawing Sheets

(51) Int. Cl.
  *B24D 13/14* (2006.01)
  *B25F 5/00* (2006.01)
  *H01M 50/20* (2021.01)
  *B24B 27/00* (2006.01)
  *B24D 9/08* (2006.01)
  *B60S 3/06* (2006.01)

(56) References Cited

U.S. PATENT DOCUMENTS

| | | | |
|---|---|---|---|
| 2015/0151422 A1* | 6/2015 | Kuehne | B24B 55/10 451/344 |
| 2015/0183107 A1 | 7/2015 | Ito et al. | |
| 2015/0263592 A1* | 9/2015 | Kawakami | B25F 5/02 310/50 |
| 2015/0280532 A1* | 10/2015 | Mizutani | B25F 5/00 310/50 |
| 2015/0314434 A1* | 11/2015 | Bevins, Jr. | B23D 59/001 30/514 |
| 2015/0328763 A1* | 11/2015 | Ito | H02J 7/00 451/359 |
| 2015/0375315 A1* | 12/2015 | Ukai | B25F 5/02 30/392 |
| 2018/0205293 A1 | 7/2018 | Kawakami et al. | |

FOREIGN PATENT DOCUMENTS

| | | |
|---|---|---|
| CN | 106553159 A | 4/2017 |
| JP | 2001225254 A * | 8/2001 |
| JP | 2015104770 A * | 6/2015 |

OTHER PUBLICATIONS

JP-2015104770-A (English Translation) (Year: 2015).*
"Model No. 9237C". Makita General Catalogue No. Z11203-1, pp. 97, 2017.
Jan. 26, 2021 Office Action issued in Chinese Patent Application No. 201810864983.1.

* cited by examiner

ELECTRIC POWER TOOL

CROSS-REFERENCE

This application claims priority to Japanese patent application serial number 2017-170254, filed on Sep. 5, 2017, the contents of which are incorporated herein by reference in their entirety.

TECHNICAL FIELD

The present invention generally relates to an electric power tool such as, for example, a polisher that is used for polishing work on a coating surface of an automobile body.

BACKGROUND ART

Generally, in an angle polisher used for performing polishing work, or in an angle disc grinder used for performing grinding work, an output shaft to which an end tip tool such as a polishing pad or a circular whetstone is attached is disposed perpendicular to a motor shaft of an electric motor serving as a power source. Angle electric power tools are disclosed in non-patent literature such as, for example, Makita General Catalogue No. Z11203C1 published June, 2017, which shows a model No. 9237C on page 97. When disc grinders such as those previously known are used, some flaws or scratches which result on the working surface from application of the polisher do not raise any problem since a working surface (grinding object) is, for example, stone material. However, when the polisher is used on another working surface, such as e.g. an automobile body, even a slight flaw or scratch may cause a problem since the working surface is more sensitive. Because of this reason, for example, special care needs to be taken when operating such a polisher on such a working surface. In particular, in polishing the working surface when the polisher used is operated by, for example, AC power, an operator must be careful not to contact the power cable with the working surface. Also, when the polisher used is operated by DC power, the operator must be careful not to contact a battery pack to the working surface.

The angle polisher Model No. 9237C disclosed in the above-described non-patent document is operated by AC power.

When said polisher is used, the user may need to stretch their hand with respect to a wide working surface (polishing surface) such as an automobile body, for using the polisher on said surface. In this case, if the user uses the polisher to which a battery pack is attached, in an up-to-down vertical direction, and in addition the user is positioned upwards relative to the polisher (in a direction away from the polishing surface), then in this case when the user attempts to use the polisher on the working surface, the battery pack may interfere with the user's hand, which may prevent the user from sufficiently stretching their hand, and may force the user to perform a polishing work with a limited range of movement, resulting in a limited tight posture. In this respect, this situation presents a problem of maneuverability, impairing the ease of use of the polisher.

Furthermore, a lower portion of the polisher may scratch, for example, an automobile body etc.

Thus, as a result of the mentioned deficiencies in the art, there is a need for polishers used in the aforementioned polishing work, on, for example, automobile body surfaces, to successfully prevent or suppress flaws or scratches from developing on the working surface as a result of application of said polisher. In addition, there is also a need for the user being able to use the polisher in a comfortable posture while stretching their hand, thereby improving maneuverability and enhancing ease of use of the polisher.

SUMMARY

In one exemplary embodiment of the present disclosure, an electric power tool includes a tool main body that houses an electric motor in a main body housing, an output shaft that protrudes from a lower portion of the tool main body and extends in an up-to-down direction, and a battery attachment portion for slide-attaching a slide-attachment type battery pack that supplies power to the electric motor. The battery attachment portion is disposed at the rear portion of the tool main body. The battery pack is attached to an upper surface of the battery attachment portion.

According to this embodiment, in particular, the battery pack is attached to the upper surface side of the battery attachment portion, which is provided at the rear portion of the tool main body. Because of this configuration, when the user is operating the device in a working posture, where a tip end tool is brought into contact with a working surface, the working surface is situated below the lower portion of the battery attachment portion, wherein the battery pack is attached to the upper surface side of the battery attachment portion, thus preventing the battery pack from interfering with the working surface.

In another exemplary embodiment of the disclosure, the battery pack is attached to the upper surface of the battery attachment portion such that its shortest dimension is aligned in the up-to-down vertical direction.

According to this embodiment, in particular, the battery pack is attached to the upper surface of the battery attachment portion such that its thickness direction (dimension of the shortest side) is aligned in the up-to-down direction, and thus the battery pack is attached in a compact manner to said portion such that its protruding length in the up-to-down direction is the shortest of all of its dimensions. Because of this configuration, the user need not worry about their hand interfering with the battery pack, and consequently the user's range of movement is expanded, and they can carry out a work in a comfortable posture (such that the battery pack does not become an obstruction for the user). In this respect, such a configuration of the battery attachment portion and the battery pack enhances maneuverability and ease of use of the electric power tool.

Furthermore, for example, when a slide-type battery pack whose thickness is large in the up-to-down direction according to a larger-than-normal battery capacity is used, as a result of the battery pack being attached to the upper surface side of the battery attachment portion, a lower end of the battery pack does not easily approach the working surface to be polished.

In another exemplary embodiment of the disclosure, an upper end of the battery attachment portion region protrudes upward higher than the upper surface of the battery pack that is attached to the battery attachment portion.

According to this embodiment, when the electric power tool is placed in an inverted manner upside down, flaws or scratches made by the battery pack on the working surface to be polished may be prevented.

In another exemplary embodiment of the disclosure, an elastic member is disposed on a lower surface of the battery attachment portion.

According to this embodiment, flaws or scratches on the working surface to be polished can be prevented when the battery attachment portion incidentally happens to contact said working surface.

In another exemplary embodiment of the present disclosure, an electric power tool includes a tool main body that houses an electric motor in a main body housing, an output shaft that protrudes from a lower portion of the tool main body and extends in an up-to-down direction, and a battery attachment portion for slide-attaching a slide-attachment type battery pack that supplies power to the electric motor. The battery attachment portion is disposed at the rear portion of the tool main body. Furthermore, an elastic member is disposed on a lower surface of the battery attachment portion.

According to this embodiment, flaws or scratches can be prevented by the elastic member when the battery attachment portion directly interferes with the working surface.

In another exemplary embodiment of the present disclosure, a polisher includes a tool main body that houses an electric motor in a main body housing, an output shaft that protrudes from a lower portion of the tool main body and extends in an up-to-down direction, and an elastic member that is disposed on at least a part of the lower portion of the tool main body.

According to this embodiment, flaws or scratches can be prevented by the elastic member when the main body housing directly interferes with the working surface.

DETAILED DESCRIPTION

The detailed description set forth below, when considered with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, these specific details refer to well-known structures, components and/or devices that are shown in block diagram form in order to avoid obscuring significant aspects of the exemplary embodiments presented herein.

Figure 7:
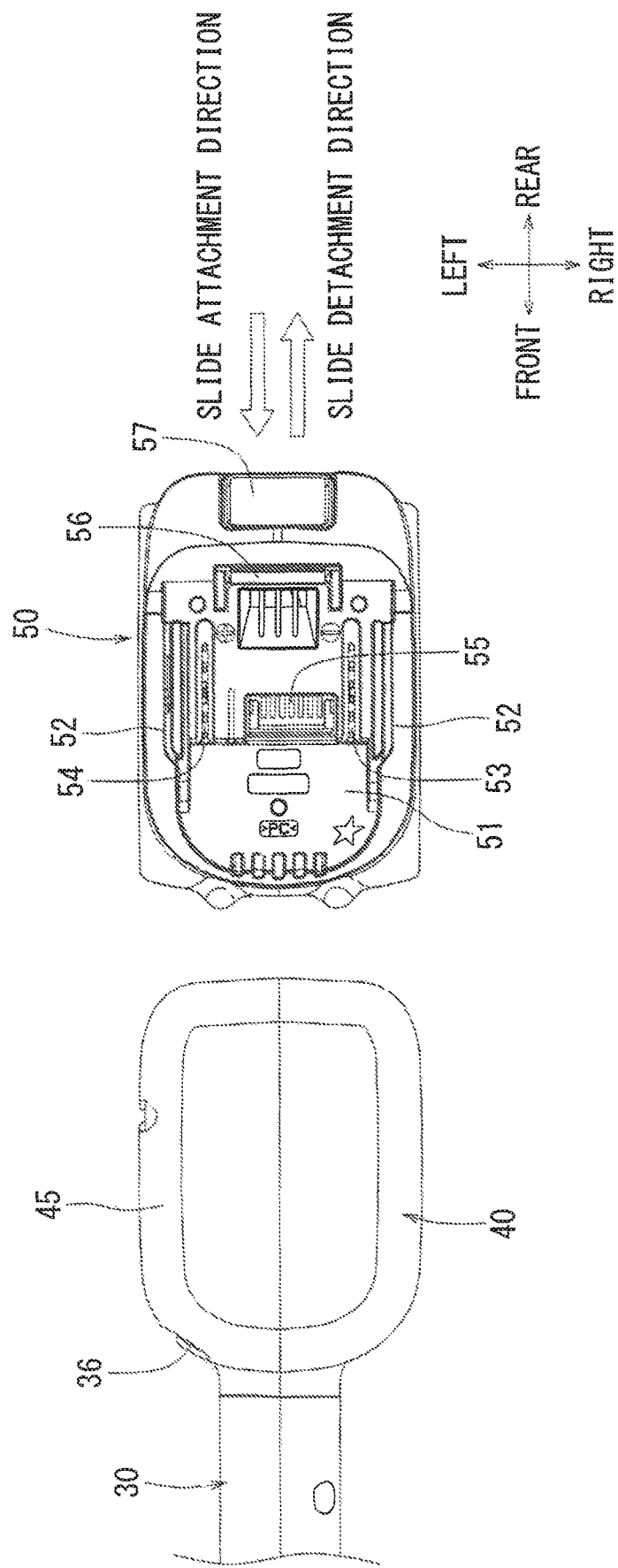
FIG. 7 is a bottom view of the battery attachment portion in the state where the battery pack is detached therefrom in the rearward direction, viewed in the direction indicated by an arrow (VII) in FIG. 5.
Figure 8:
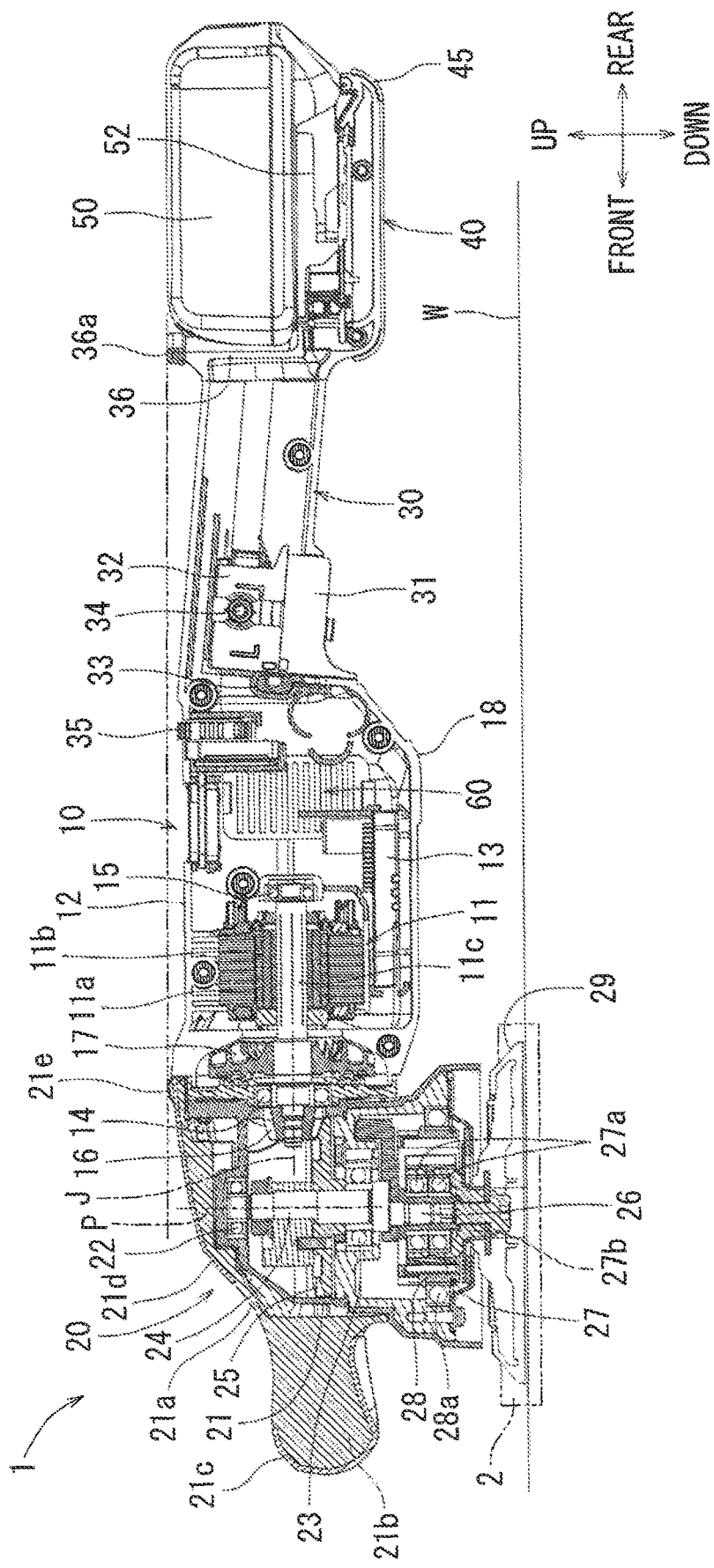
FIG. 8 is a longitudinal sectional view of the electric power tool according to the exemplary embodiment.

Representative, non-limiting embodiments according to the present disclosure will be described with reference to FIGS. 1 to 18. As shown in FIGS. 1 to 4, a rechargeable polisher 1 is exemplified as an electric power tool 1 in this embodiment. FIG. 8 shows the internal cross-sectional structure (perpendicular to the left-right axis) of the electric power tool 1. The electric power tool 1 may include a tool main body 10 that houses the electric motor 11 as a drive source, an output portion 20 that is provided at a front portion of the tool main body 10, a grip 30 that is provided at a rear portion of the tool main body 10, and a battery attachment portion 40 that is provided at a rear portion of the grip 30, to the rear of the grip 30. In the following embodiments, the upward, rearward, leftward and rightward directions are described relative to the position of a user who holds the grip 30 with his or her body facing the front portion of the tool main body 10. A tip end tool 2 such as, for example, a polishing pad may be attached to a lower surface side of the output portion 20. With regard to the orientation of directions recited as up and down, the side of the tip end tool 2 is referred to as the downward direction, where the rest of the output portion 20, is upward relative to the tip end tool 2, as shown in FIG. 8.

As shown in FIGS. 1 to 4 and FIG. 8, the tool main body 10 may have a roughly tubular shape extending in the front-to-rear direction, which corresponds to the longitudinal axis thereof (the tool main body length direction). As shown in FIG. 8, the electric motor 11 that is housed in the tool main body 10 may be a brushless motor which includes a cylindrical-shaped stator 11*a* that is fixed to the main body housing 12 of the tool main body 10 as well as a rotor 11*b* that is rotatably supported on the inner circumferential periphery of the stator 11*a* via a motor shaft 11*c*. The motor shaft 11*c* may be rotatably supported via a front bearing 14 and a rear bearing 15. The longitudinal axis of the motor shaft 11*c* (motor axis J), parallel to the longitudinal axis of the tool main body 10, may correspond to the front-to-rear lengthwise direction (corresponding to the tool main body length direction) of said shaft 11*c*. A cooling fan 17 may be supported by the motor shaft 11*c*, by being inserted on and rotating about the longitudinal axis of said shaft 11*c*, between the front bearing 14 and the rotor 11*b*. As a result of the cooling fan 17 being inserted on said shaft 11*c*, where it fully surrounds said shaft 11*c*, and fits with said shaft 11*c* in a tight manner due to the presence of front bearing 14, the cooling fan 17 may rotate synchronously with the motor shaft 11*c*.

Figure 1:
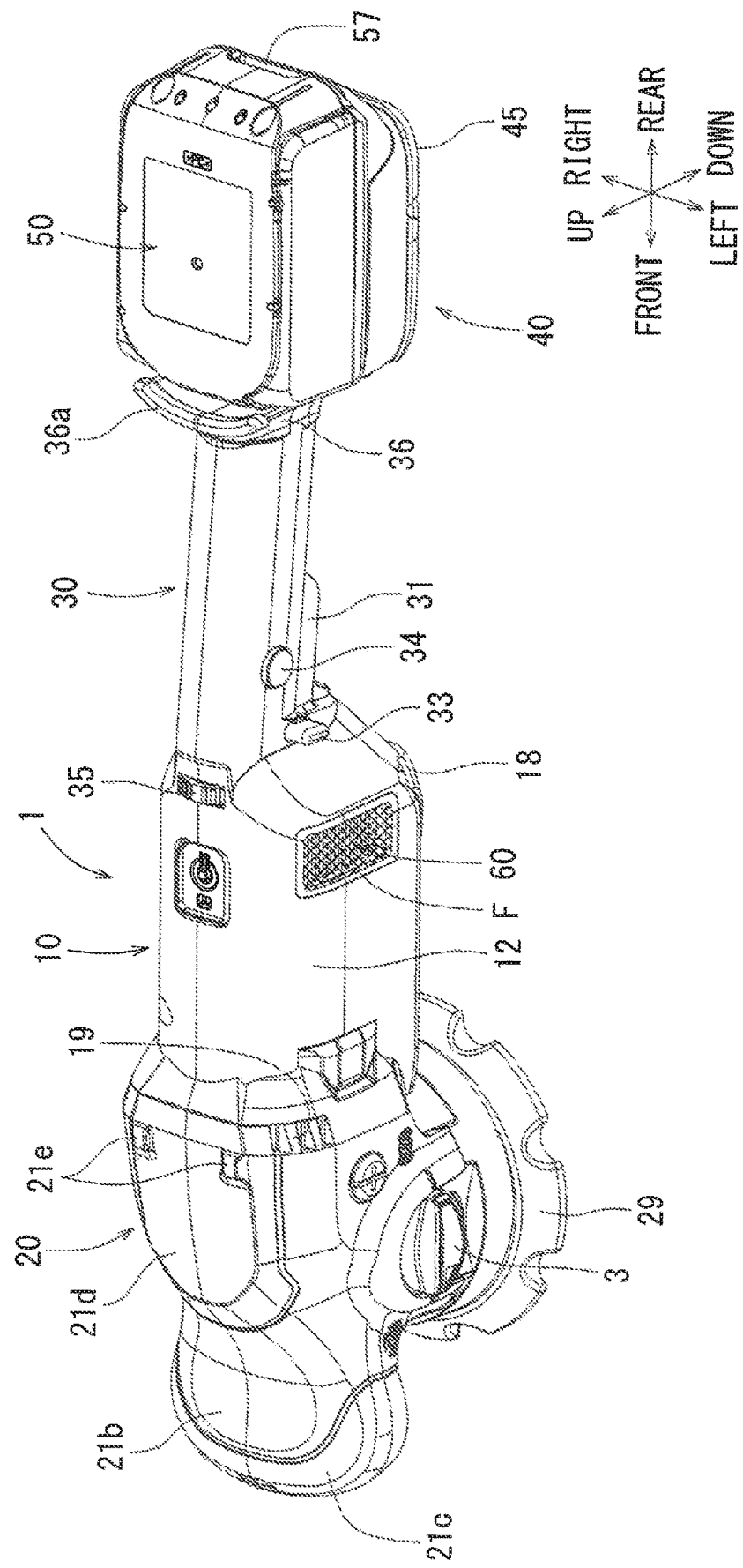
FIG. 1 is an overall perspective view of an electric power tool according to an exemplary embodiment of the present disclosure.

A controller 13, which houses a control circuit board by use of which operation of the electric motor 11 is controlled, may be disposed below the electric motor 11. The controller 13 may have a rectangular flat-plate shape and may be attached to the inner peripheral surface of the lower basal portion of the main body housing 12. The controller 13 may be housed in the main body housing 12 such that it is laid flat in a state where that the shortest dimension (thickness) of said controller 13 is aligned in the up-to-down direction, and its top and bottom rectangular base may extend in the front-rear left-right directional plane, perpendicular to the vertical up-to-down direction. As seen in FIG. 1, spaced apart exhaust window vents 19 in a grille-shaped manner may be provided around the cooling fan 17 on the left and right side upper portions of the front end of the tool main body 10. Outside air may be introduced from an intake grille 60 that is disposed on the rear side of the tool main body 10 by use of the cooling fan 17 which operates by rotation of electric motor 11, sucking in air through the intake grille 60. The introduced outside air (cooling air) may then cool the electric motor 11 and the controller 13. After cooling said components, in a terminal point of the intake air flow path through tool main body 10, the cooling air may then be discharged from the grille comprising exhaust window vents 19 to the outside by air flow generated by the same previous rotation of the cooling fan 17.

A drive-side bevel gear 16 may be provided on the front portion of the motor shaft 11*c*. The bevel gear 16 may engage with a driven-side bevel gear 25 on the side of the output portion 20, which is frontwards and orthogonal relative to the bevel gear 16. The driven-side bevel gear 25 may be rotatably supported by an interior of a metal-made gear housing 21 that is connected and adjacent to the front portion of the main body housing 12 of the tool main body 10.

An output shaft 24 is formed within the interior of the gear housing 21, and is rotatably supported by the gear housing 21 via an upper bearing 22 and a lower bearing 23, which are present as part of the gear housing 21. The driven-side bevel gear 25 may be connected to the output shaft 24, wherein the driven-side bevel gear 25 fully surrounds and is fitted on the output shaft 24. The output shaft 24 may rotate by means of the drive-side bevel gear 16 complementarily engaging with the driven-side bevel gear 25, where the two gears are enmeshed with each other. The output shaft 24 may rotate about its longitudinal axis in the vertical up-to-down direction (around an output axis P). As shown in FIG. 8, the output axis P may be orthogonal to and intersect the motor axis J, which shows that the electric power tool 1 is an angle polisher.

An eccentric shaft 26 may be integrally formed with the output shaft 24, extending downward from the lower surface of said output shaft 24. The longitudinal axis of the eccentric shaft 26 may be disposed parallel to and spaced apart from the output axis P by a predetermined distance. A cylindrical-shaped moving main body 27, which includes engagement teeth on its outer peripheral circumference, may be supported to fit completely around the eccentric shaft 26 in a rotatable manner via two bearings 27*a*, which surround the axis of the eccentric shaft 26 in a tight fitting configuration. Furthermore, a cylindrical-shaped dependent body 28, which has a larger diameter than the moving main body 27, may be supported to fit completely around the moving main body 27 by the gear housing 21 in a rotatable manner about the output axis P. The moving main body 27 may protrude downwards from the gear housing 21. A circular base portion 29 for attaching, for example, a pad as the tip end tool 2 may be attached to a portion 27*b* formed integrally with the moving main body 27 that protrudes below the moving main body 27.

The moving main body 27 moves synchronously with the eccentric shaft 26 in an eccentric manner by the rotation of eccentric shaft 26 around the output shaft 24, when the output shaft 24 itself is driven and rotates about its own longitudinal axis. In a state where the dependent body 28 engaged with the moving main body 27 is rotatable, the moving main body 27 may only revolve around the output axis P; i.e., because due to the dependent body 28 being circular and also rotating about axis P at its radial center, the engagement position of the moving main body 27 with respect to the dependent body 28 is not changed. However, in a state where rotation of the dependent body 28 around the axis P is locked, an engagement position of the moving main body 27 with respect to the dependent body 28 may change with the rotation of moving main body 27 around the output axis P, and thus the moving main body 27 may not only rotate around the output axis P but also rotate eccentrically with rotation about the eccentric shaft 26 resulting in a shift of position relative to the dependent body 28. In a soft mode in which the tip end tool 2 only rotates around the output axis P, a polishing work with a clean finish may be performed. In contrast, in a powerful mode in which the tip tool end 2 not only rotates around the output axis P but also rotates eccentrically about the eccentric shaft 26, shifting position relative to the dependent body 28, a rapid polishing work may be performed. A mode select dial 3 that is disposed on the left side of the output portion 20 enables the user to select between the soft mode (a state where the dependent body 28 is rotatable) and the powerful mode (a state where rotation of the dependent body 28 is locked).

The outer peripheral surface of the gear housing 21 may be covered by a resin-made auxiliary housing 21*a*. A sub grip 21*b* for the user to hold the rechargeable polisher 1 with one hand may protrude forward from the front side of auxiliary housing 21a, forming the front most portion of the polisher. A frontal lower surface of the sub grip 21b, as well as an upper surface of the auxiliary housing 21a may be covered by elastic resin layers 21c and 21d, respectively, made of elastomer rubber, for the purpose of preventing flaws or scratches on the working surface W. Two legs 21e used for placing the tool upside down may be formed at the top of the elastic resin layer 21d that covers the upper surface of the auxiliary housing 21a. When the electric power tool 1 is placed upside down, the elastic resin-made legs 21e may contact the surface on which the polisher 1 is placed, thereby preventing flaws or scratches on the working surface W.

Figure 2:
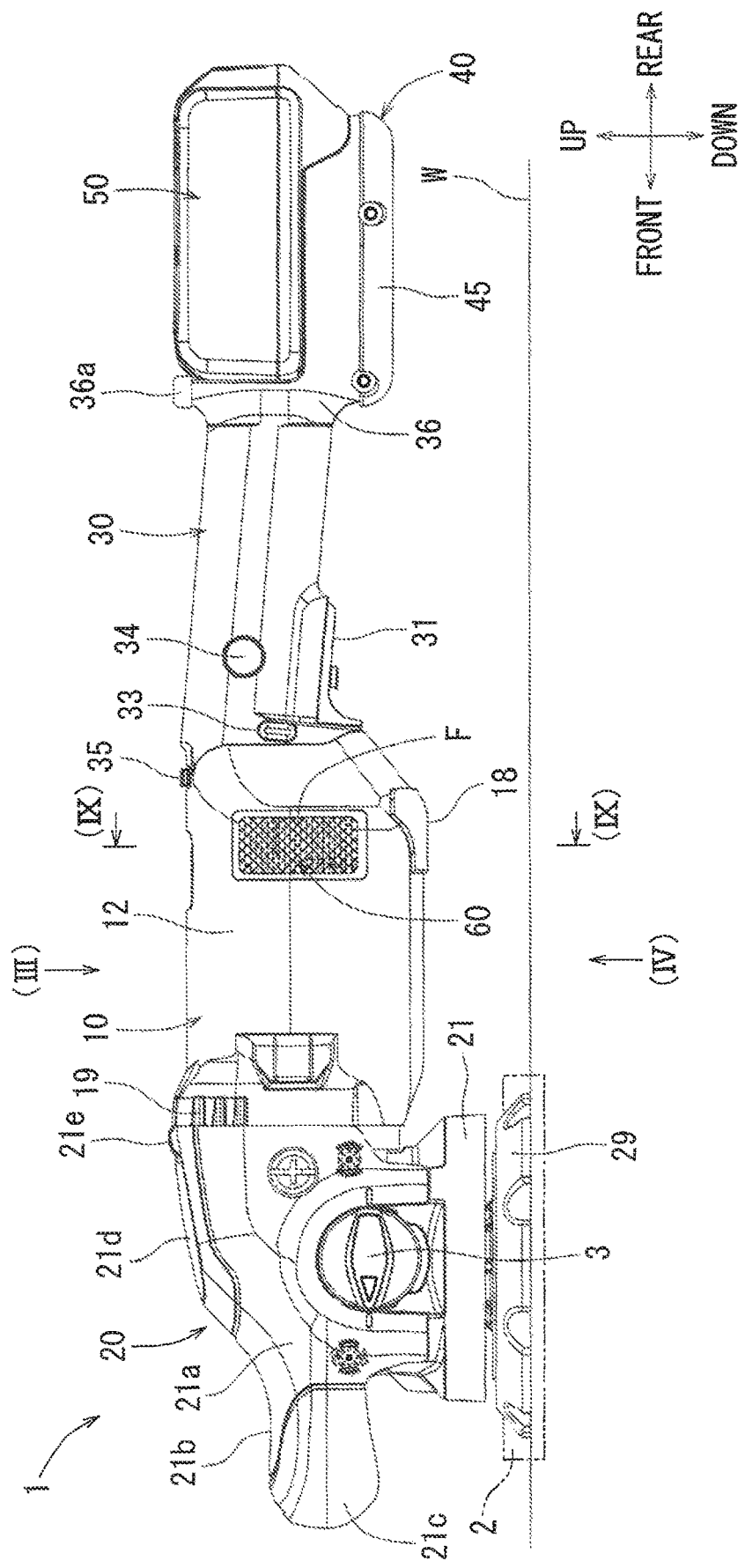
FIG. 2 is an overall side view of the electric power tool according to the exemplary embodiment.
Figure 4:
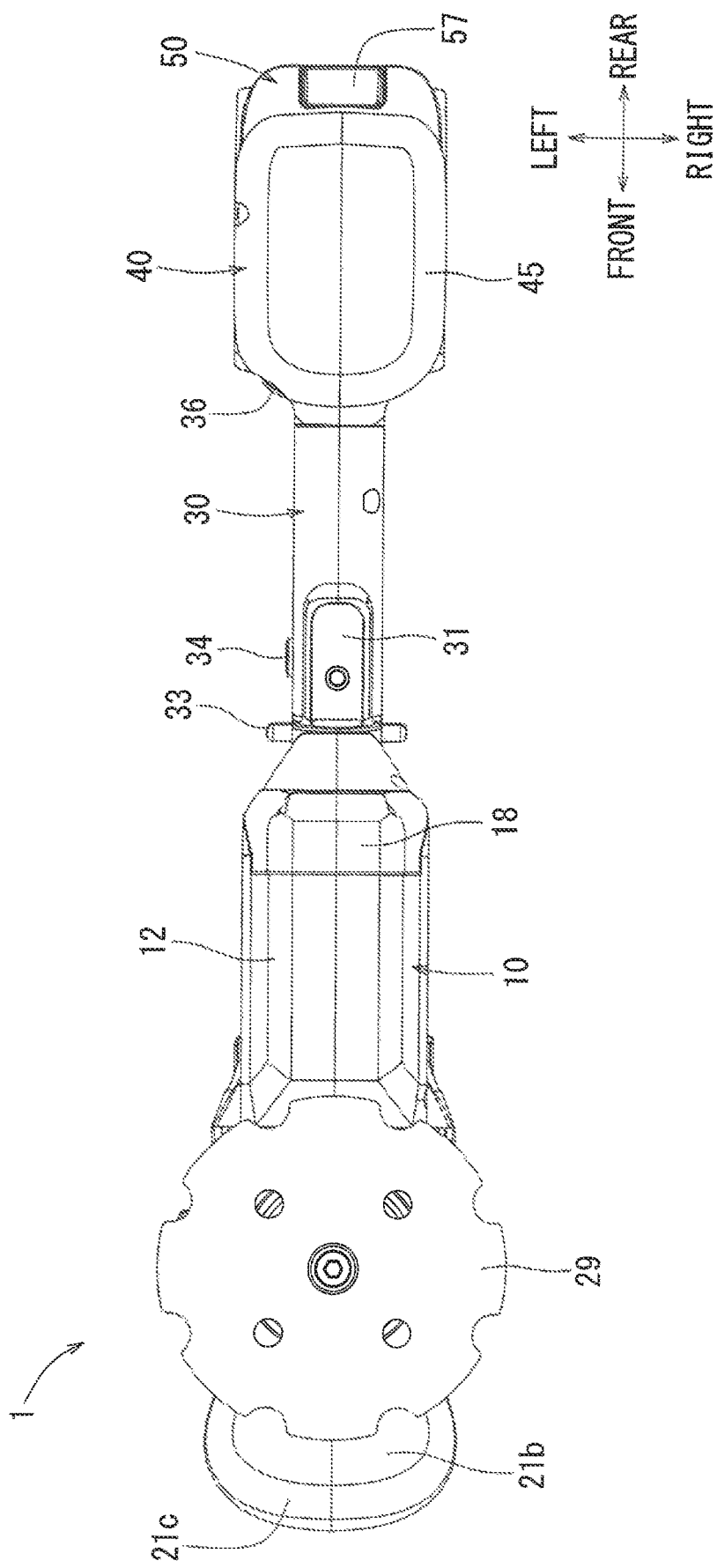
FIG. 4 is a bottom view of the electric power tool according to the exemplary embodiment viewed in the direction indicated by an arrow (IV) in FIG. 2.

A grip 30 with which the user may hold the polisher 1 is provided on a rear portion of the tool main body 10, extending in the rearward direction. The grip 30 may be formed in a tubular shape with a diameter sized small enough so that the user can easily hold the polisher 1 with one hand. As shown in FIGS. 2 and 4, a switch lever 31 which the user may pull upward by using their fingertip while simultaneously maintain a hold on the grip 30 may be provided on the front lower surface of the grip 30. A start lock lever 33 may be provided on the front side of the switch lever 31. When the start lock lever 33 is moved rightwards or leftwards, a locked state of the switch lever 31 may be released, putting the electric power tool 1 in an on-operable state.

As shown in FIG. 8, a switch main body 32 may be housed in the front portion of the interior of the grip 30, located above the switch lever 31. When the switch lever 31 is pulled upwards by the user, the switch main body 32 may be turned on. When the switch main body 32 is turned on, the electric motor 11 may start and the tip end tool 2 may rotate. A rotation number of the electric motor 11 can be adjusted according to the extent the switch lever 31 is pulled upwards. A disk-shaped lock-on button 34 may be provided on the left side of the grip 30 above the switch lever 31. When the lock-on button 34 is pressed while the switch lever 31 is being pulled upwards, the switch lever 31 may be held (locked) at the highest position to which it is pulled up. By locking the switch lever 31 at the highest pulled position, the user can easily perform a polishing work for a long time without having to constantly hold the switch lever 31 with their finger at the highest pulled position. When the switch lever 31 is pulled again, from said locked position, the locked state of the switch lever 31 induced by the pressing of lock-on button 34 may be released and the switch lever 31 can be returned downwards to an off-position.

Figure 3:
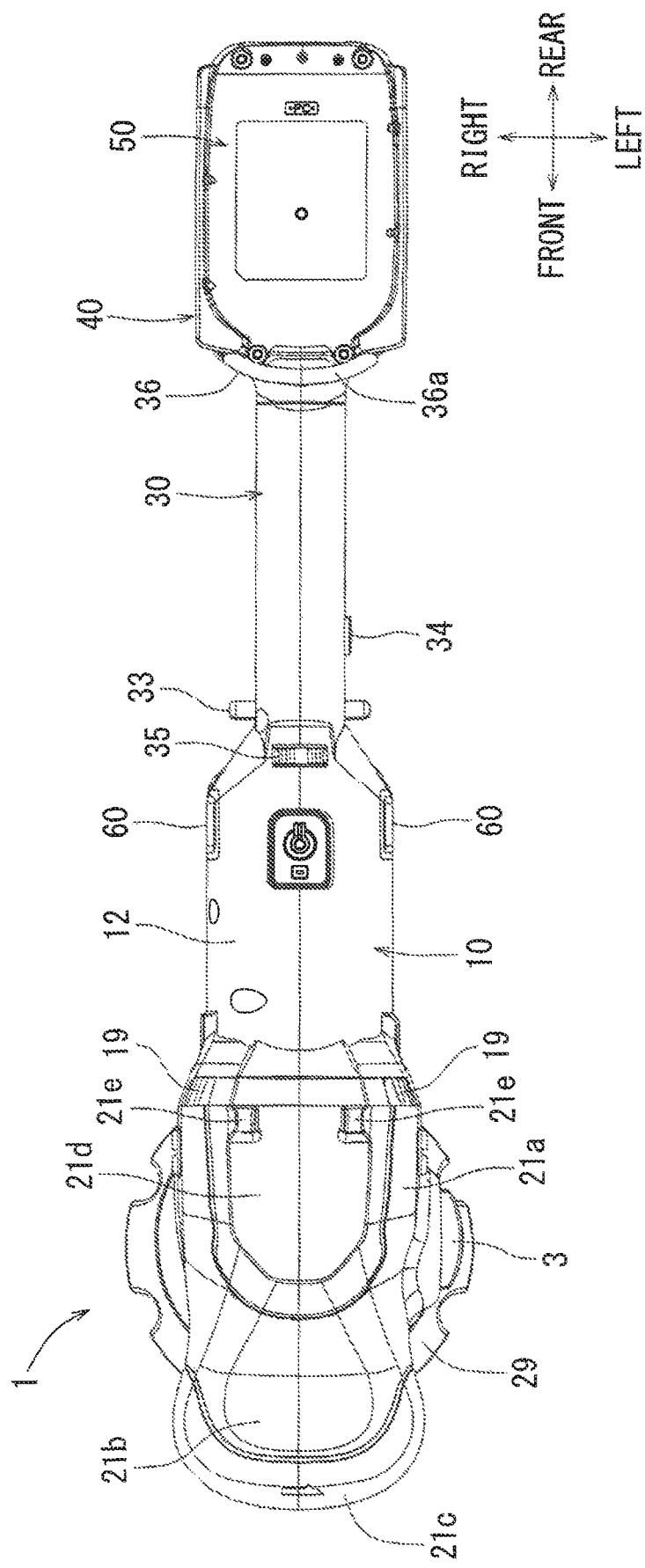
FIG. 3 is a top view of the electric power tool according to the exemplary embodiment viewed in the direction indicated by an arrow (III) in FIG. 2.

As shown in FIGS. 1 to 3, a speed adjustment dial 35 may be provided on the upper front surface of the grip 30. By positioning the speed adjustment dial 35 at this position, the user can rotate the speed adjustment dial 35 with a finger while maintaining a hold with their hand on the grip 30. By rotating the speed adjustment dial 35 with a finger in this manner, the rotation number of the electric motor 11, governing speed, can be adjusted.

Figure 5:
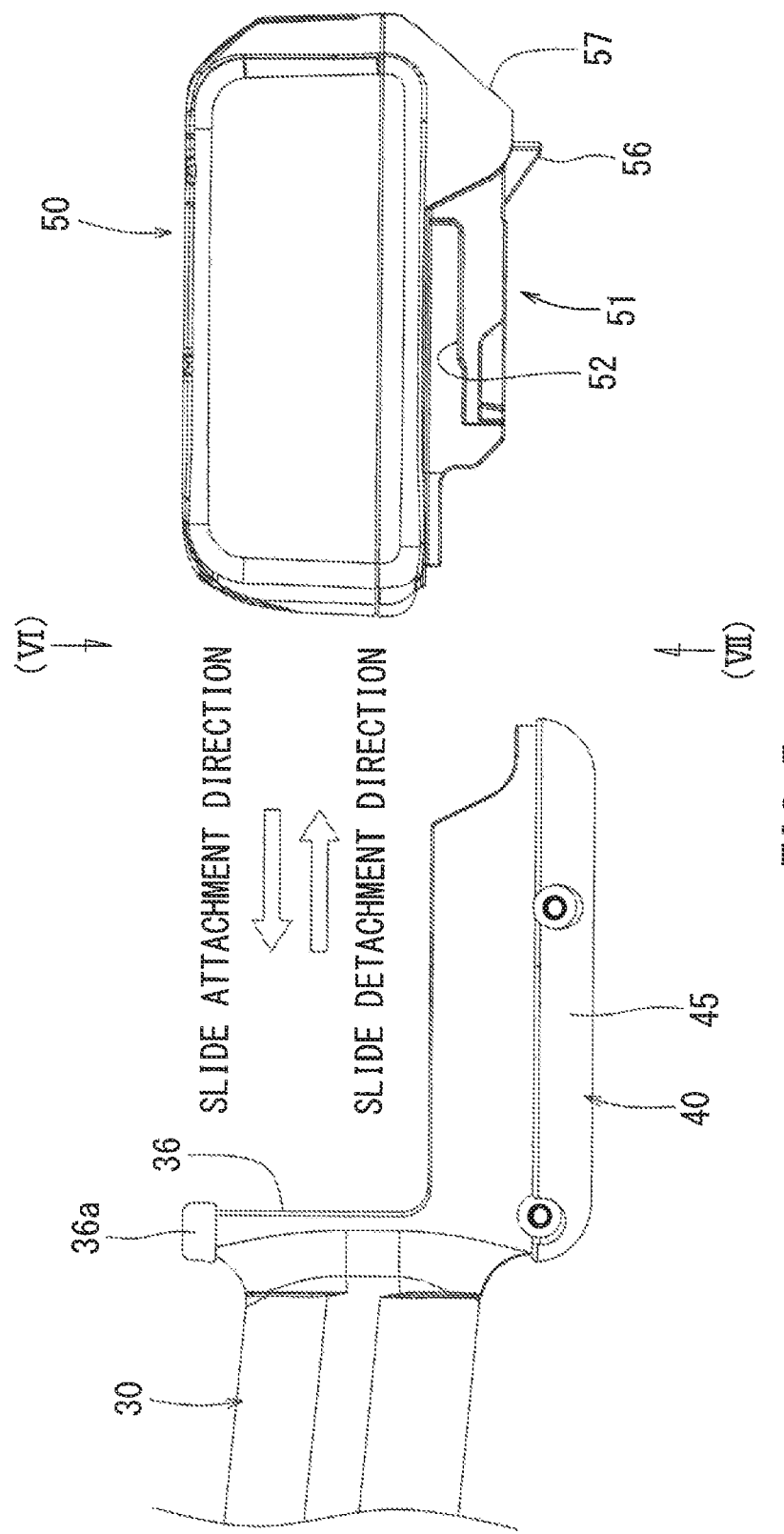
FIG. 5 is a left-side view of a battery attachment portion in a state where a battery pack is detached therefrom in a rearward direction.

A battery attachment portion 40 may be provided on a rear portion of the grip 30 (facing the user). A battery pack 50, forming the rearmost part of the rechargeable polisher 1, may be attached to the battery attachment portion 40 as a power source. The battery attachment portion 40 may be formed in a flat plate shape (a pedestal shape) extending rearwards from a rear end of the grip 30. A vertical wall 36 extending mainly in the up-to-down direction may be integrally formed with the grip 30 at the rear end portion of the grip 30. In particular, the vertical wall 36 may be formed in a curved, concave shape in the forward direction as shown in FIG. 1. A top portion of the vertical wall 36 may be covered with an elastic resin layer 36a made of elastomer rubber. As shown in FIGS. 2 and 5, the battery attachment portion 40 may be provided such that it extends rearwards from a lower portion of the vertical wall 36.

Figure 6:
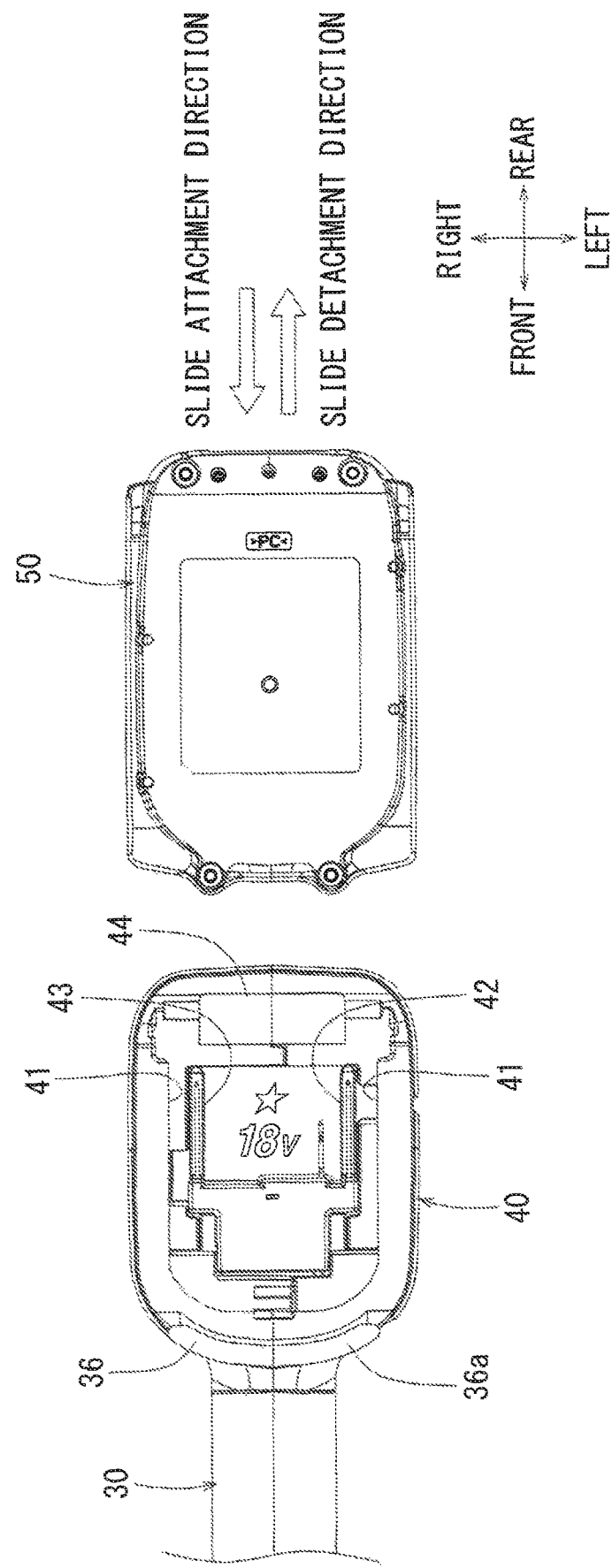
FIG. 6 is a top view of the battery attachment portion in the state where the battery pack is detached therefrom in the rearward direction, viewed in the direction indicated by an arrow (VI) in FIG. 5.

One battery pack 50 can be mechanically and electrically attached to an upper surface of the battery attachment portion 40. As shown in FIG. 6, a pair of rails 41 may be provided on the upper surface of the battery attachment portion 40, joining together at the front of the upper surface of the battery attachment portion 40 in a concave manner with respect to the front direction. The slide attachment direction for attaching the battery pack 50 to the battery attachment portion 40 may be in the front-to-rear direction in accordance with the rear portion of the pair of rails 41. As shown in FIGS. 5 to 7, the battery pack 50 can be attached to the upper surface side of the battery attachment portion 40 by sliding the battery pack 50 from the rear to the front of battery attachment portion 40. Conversely, the attached battery pack 50 can be detached from the upper surface of the battery attachment portion 40 by sliding the battery pack 50 in the rearward direction. A positive terminal 42 and a negative terminal 43 may be disposed between the pair of the rails 41. A lock groove 44 on the battery attachment portion 40 may be provided for engaging with a lock claw 56 on the battery pack 50.

A lower portion of the battery attachment portion 40 may be covered with an elastic resin layer 45 made of elastomer resin. In particular, in the present embodiment, the entire outer peripheral circumference of the ovular lower surface of the battery attachment portion 40 may be covered with the elastic resin layer 45 as shown in FIG. 7. This way, even if the battery attachment portion 40 contacts the working surface W, flaws or scratches are prevented from being formed on the working surface W by the elastic resin layer 45.

The battery pack 50 may include a plurality of lithium ion battery cells that are housed in a battery case formed approximately in a rectangular parallelepiped shape. The battery pack 50 may be used as a power source which is inter-compatible with other chargeable electric power tools such as, for example, a screw driver etc. The battery pack 50 can be recharged by use of a dedicated charger and repeatedly used as a power source of said electric power tools. The battery pack 50 may be attached to the battery attachment portion 40 such that the longitudinal direction of the battery pack 50 is aligned with the front-to-rear direction, its transverse direction is aligned with the left-to-right direction, and its thickness direction (the shortest dimension) is aligned with the vertical up-to-down direction.

As shown in FIG. 7, a pair of rail receiving portions 52 for guiding the pair of rails 41 of the battery attachment portion 40 to engage with the battery pack 50 in a complementary fitting manner may be provided on a connection portion 51 of the battery pack 50. The battery pack 50 may be guided in a sliding direction (in the front-to-rear direction) by engaging the rails 41 with the rail receiving portions 52, resulting in an interlocking connection. Similarly, a positive terminal receiving portion 53 for advancing (receiving) the positive terminal 42 and a negative terminal receiving portion 54 for advancing (receiving) the negative terminal 43 may be provided between the pair of the rail receiving portions 52. When the positive terminal 42 advances to the positive terminal receiving portion 53 and the negative terminal 43 advances to the negative terminal receiving portion 54, respectively, by the slide attaching action of the battery pack 50 to the battery attachment portion 40 by being moved in the forward direction, both terminals 42 and 43 may be electrically connected to the battery pack 50. A connector 55 comprising a signal connector terminal may be provided between the positive terminal receiving portion 53 and the negative terminal receiving portion 54. This connector 55 may be used for transmitting/receiving control signals between the battery pack 50 and the charger while the battery pack 50 is being charged by the charger, but is not used (connected) when the battery pack 50 is attached to the battery attachment portion 40.

As shown in FIGS. 5 and 7, the lock claw 56 may be provided at the rear portion of the connection portion 51 of the battery pack 50, forming the bottom most portion of the battery pack 50. The lock claw 56 may be biased to protrude in the downward direction, but may be pushable upwards against said bias. The battery pack 50 may be locked in an attached manner to the battery attachment portion 40 by an engagement of the lock claw 56 with the lock groove 44. A lock release button 57 for moving the lock claw 56 to an unlock position (i.e. upward) may be provided on a rear side of the battery pack 50. When the lock release button 57 is pushed in the upward direction, the lock claw 56 may be moved upwards against the biasing force. When the lock claw 56 is moved upwards, it is extracted from the lock groove 44, and the battery pack 50 can be slid rearwards in the detaching direction.

As discussed above, the upper portion of the vertical wall 36 may be covered with the elastic resin layer 36a made of elastomer rubber. As shown in FIG. 8, in a state where the battery pack 50 is attached to the upper surface of the battery attachment portion 40, positions of elastic resin layer 36a and the battery attachment portion 40 in the up-to-down direction may be configured in an appropriate manner, such that the elastic resin layer 36a is higher in the up-to-down direction compared to the entirety of the upper surface of battery pack 50. Similar to the above-mentioned reverse legs 21e, the elastic resin layer 36a may also serve as a outwardly protruding portion which may be placed on and contact the working surface W when the electric power tool 1 is placed reversely upside down to be placed on the working surface W, where the resin contacts the working surface W instead of the upper surface of battery pack 50, because as shown in FIG. 8 the resin layer 36a is higher than the entirety of battery pack 50. Thus by the elastic resin layer 36 contacting the working surface W, the battery pack 50 may not directly come into contact with the working surface W, thereby preventing occurrence of trouble such as, for example, the formation of unintended flaws or scratches on the working surface W.

Other than the above-mentioned places, some other portions of the electric power tool 1 may also be covered with protruding elastic resin layers in a similar manner in order to prevent flaws or scratches on the working surface W. In the present embodiment, the lower surface of the rear portion of the tool main body 10 may be covered with the elastic resin layer 18 made of elastic rubber. As shown in FIGS. 2 and 4, an angled corner portion may be formed at the lower surface of the rear portion of the tool main body 10 such that, from front-to-rear, the lower peripheral surface of the rear portion of the tool main body 10 is tilted upwards at a positive angle of approximately 45 degrees relative to the longitudinal front-to-rear horizontal axis of the tool main body 10, as the tool main body 10 extends rearwards. In the present embodiment, an entirety of this portion may be covered with the elastic resin layer 18. Due to its surface characteristics, this elastic resin layer 18 can prevent the formation of flaws or scratches on the working surface W, compared of the case where the tool main body 10 is not covered by such an elastic resin layer.

Figure 9:
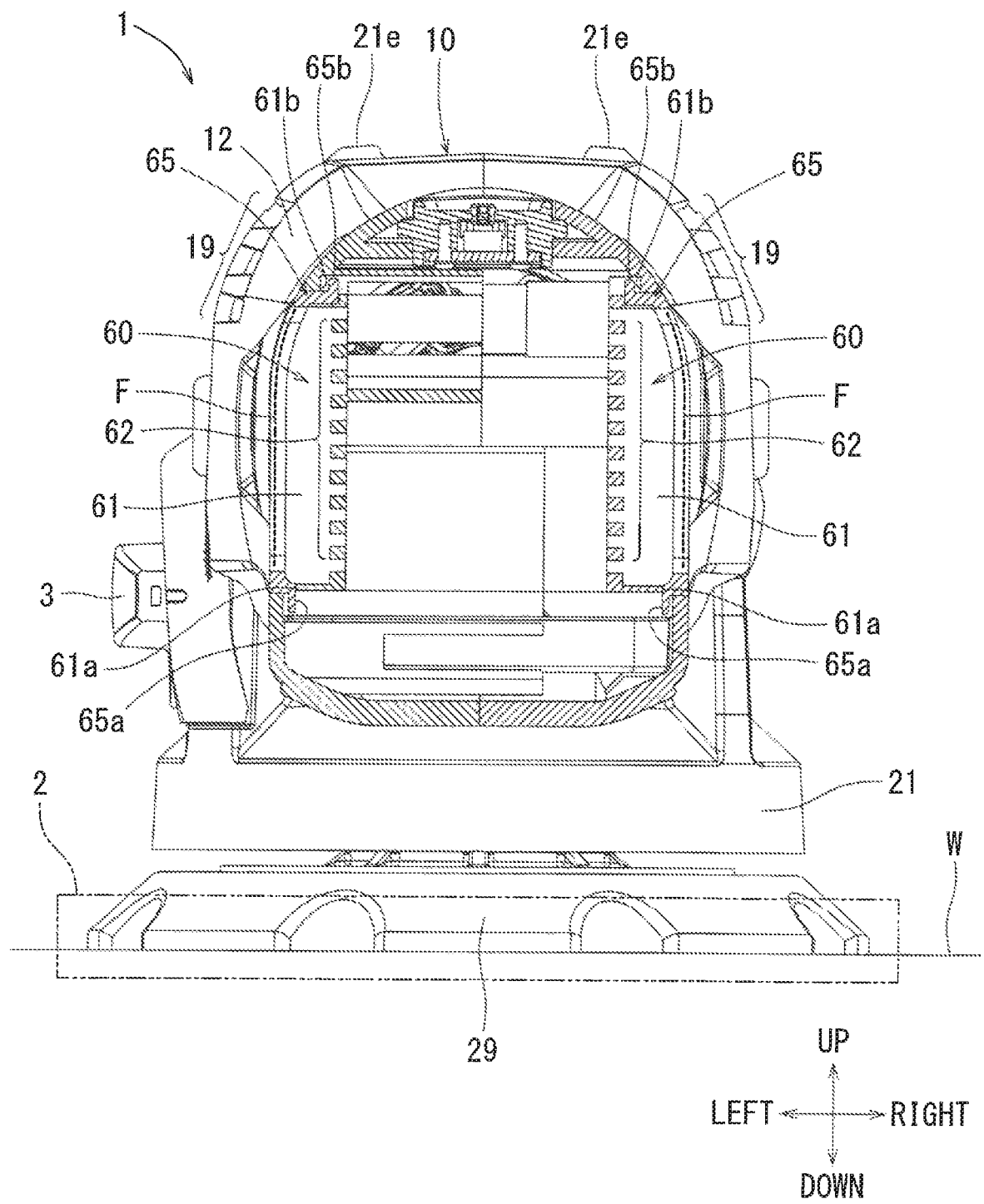
FIG. 9 is the cross-sectional view of the electric power tool according to the exemplary embodiment taken along line (IX)-(IX) of FIG. 2, showing a longitudinal sectional view of a left and right inlet port.
Figure 10:
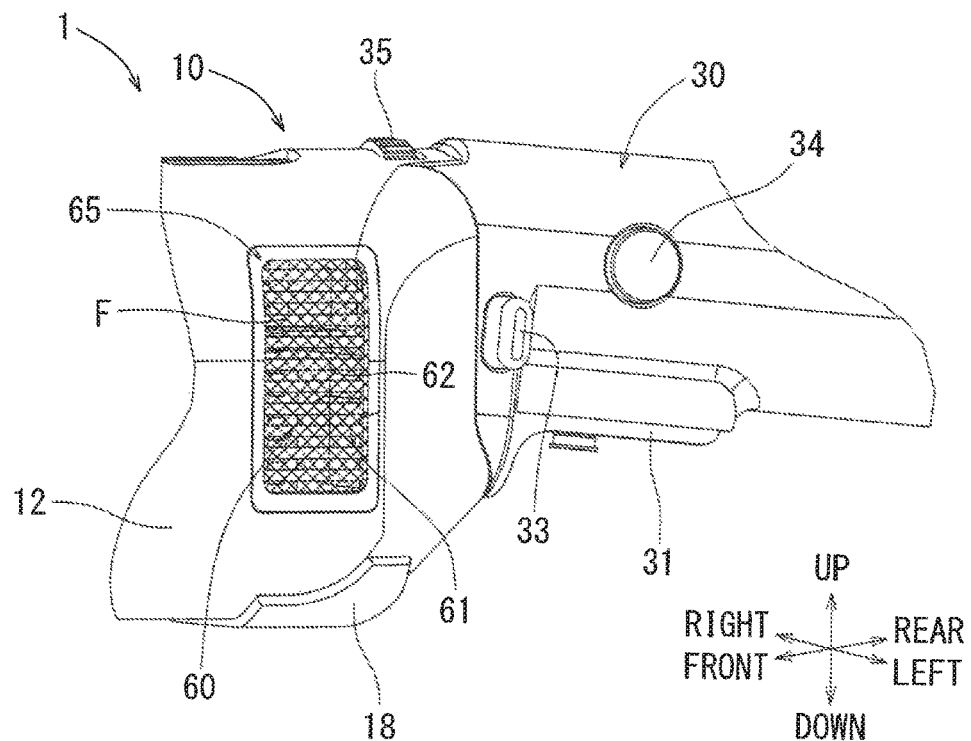
FIG. 10 is a left-side view of the electric power tool from the rear portion of the tool main body to the front portion of a grip thereof, showing a state where an auxiliary filter is attached to the inlet port with a frame body.
Figure 11:
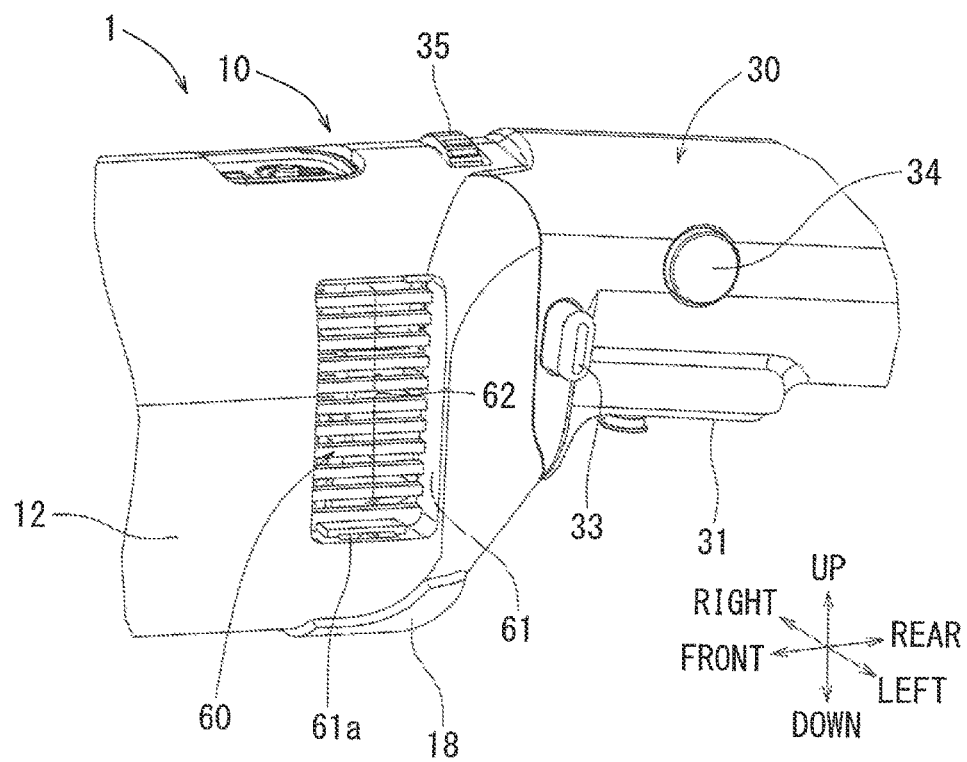
FIG. 11 is a left-side view of the electric power tool from the rear portion of the tool main body to the front portion of the grip, showing a state where the auxiliary filter and the frame body are detached from the inlet port.

Intake window grille 60 for introducing outside air may be provided on both right and left sides of the rear portion of the tool main body 10. When the electric motor 11 starts and the cooling fan 17 rotates, said rotation may generate a vacuum effect, sucking outside air from the intake window grille 60 into the interior of the tool main body 10 to cool the electric motor 11 etc. FIGS. 9 to 18 show the intake window grille 60 in detail. The right and left intake window grille 60 may have the same structural configuration, and oppositely mirror each other about the longitudinal front-to-rear axis. The intake window grille 60 may span the entirety of a vertically extended opening 61. The intake window grille 60 may also comprise a plurality of vertically spaced apart ventilation ribs 62 extending in the front-to-rear direction may be provided spaced inward from the opening 61, where the plurality of ventilation ribs 62 spans the vertical length of the opening 61 of the intake window grille 60, thereby forming in a drain board shape. A filter F may be inserted onto the intake window grille 60, over the ventilation ribs 62 of intake window grille 60. The filter F may include a plurality of squares. In more detail, in this embodiment, one side of the square may be 1 mm-1.5 mm, or 0.1 mm-0.3 mm. The filter F may be formed in another configuration such as, for example, a parallelogram or a rectangle, and its length may be chosen arbitrarily to be a predetermined amount. A filter frame 65 may be integrally formed around the filter F. The filter F may be attached to the opening 61 along the outer surface side of the ventilation ribs 62. The filter F can be retained at a predetermined position by inserting it snugly forming a tight fit with the inner peripheral surface about the entire perimeter of the opening 61. Two retaining configurations of the filter frame 65 with respect to the opening 61 will be explained below. FIG. 10 shows a state where the filter F is inserted into the opening 61 and FIG. 11 shows a state where the filter F is detached from the opening 61.

Figure 12:
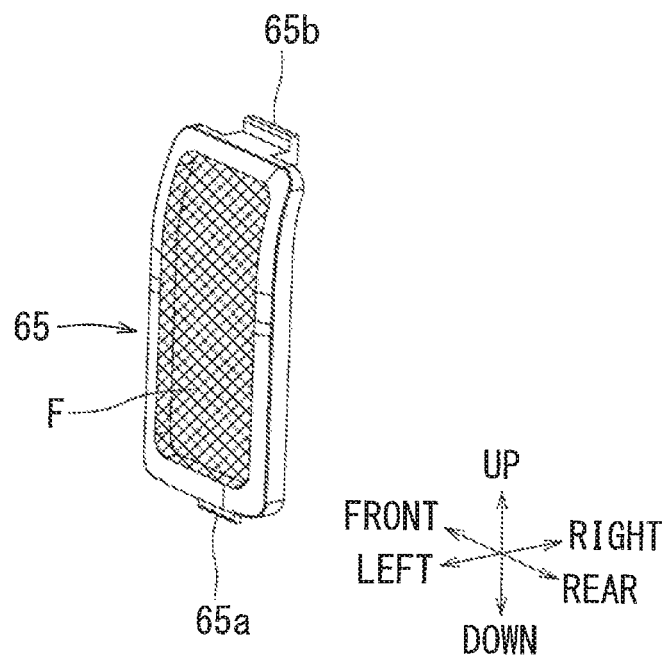
FIG. 12 is a perspective view of a single frame body with the filter detached from the inlet port, viewed from the outside.
Figure 13:
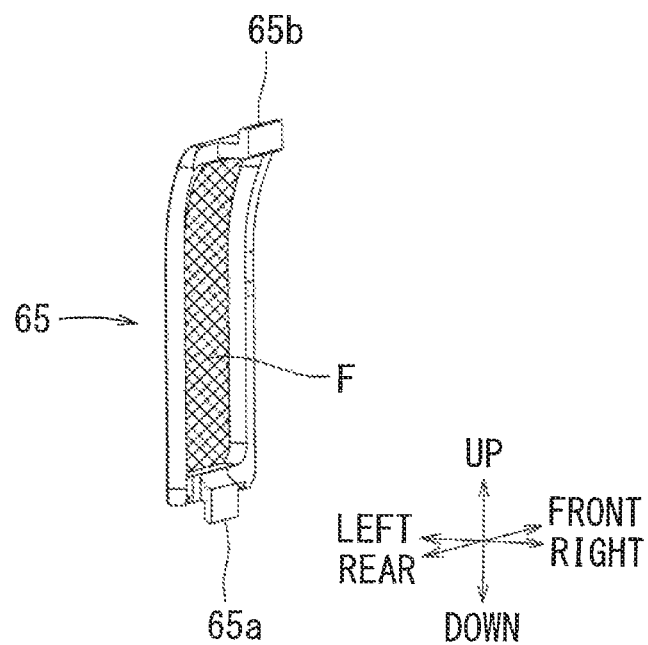
FIG. 13 is a perspective view of the single frame body with the filter detached from the inlet port, viewed from the inside.

As shown in FIGS. 12 and 13, the filter frame 65 according to a first embodiment may have approximately a rectangular frame shape. In the first embodiment, an L-shaped lock claw 65b may be provided at an upper portion of the filter frame 65, and an engagement portion in the form of a downwardly extending rectangular plate 65a is provided at a lower portion of the filter frame 65. The filter frame 65 may be retained within the opening 61 by an elastic force (bracing force) in the up-to-down direction utilizing elastic deformation of the lock claw 65b, by which a length between the upper lock claw 65b and the lower engagement portion 65a can be changed. As shown in FIG. 9, a claw engagement portion 61b may be provided at the upper portion of the opening 61, and an engagement recess 61a at the lower portion of the opening 61. The filter frame 65 may be held in an engagement state with the opening 61 by inserting the lower engagement portion 65a into the engagement recess 61a and then inserting the upper lock claw 65b into the claw engagement portion 61b via elastic deformation of the upper lock claw 65b.

The filter F may be attached to the opening 61 over the ventilation ribs 62 in an extended state (in a state where the opening 61 is closed) by the filter frame 65 being retained. The filter frame 65 in the first embodiment may be attached to the opening 61 without rattling by elastically engaging the lock claw 65b with the claw engagement portion 61b by use of the elastic deformation of the lock claw 65b in the up-to-down curving direction. In order to detach the filter frame 65 from the opening 61, the upper lock claw 65b may be detached from the claw engagement portion 61b by the elastic deformation of the lock claw 65b in the up-to-down direction, and then the lower engagement portion 65a may be detached from the engagement recess 61a. Maintenance work on the filter F can be performed by detaching the filter frame 65.

Figure 14:
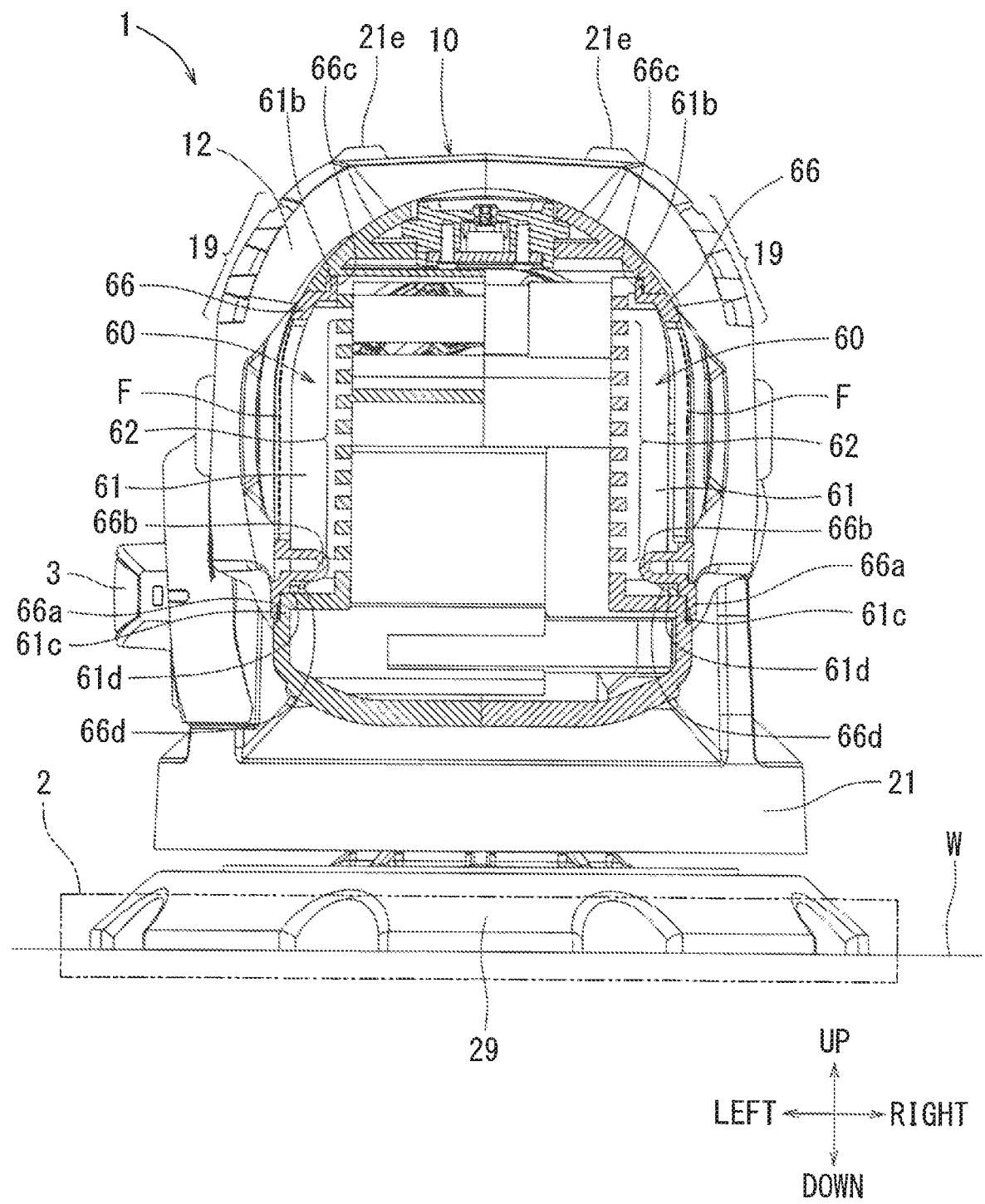
FIG. 14 is a cross-sectional view of the electric power tool taken along the same line as the line (IX)-(IX) of FIG. 2, showing the state where an auxiliary filter is attached to the inlet port by use of a frame body according to a second embodiment having a different attaching structure.
Figure 15:
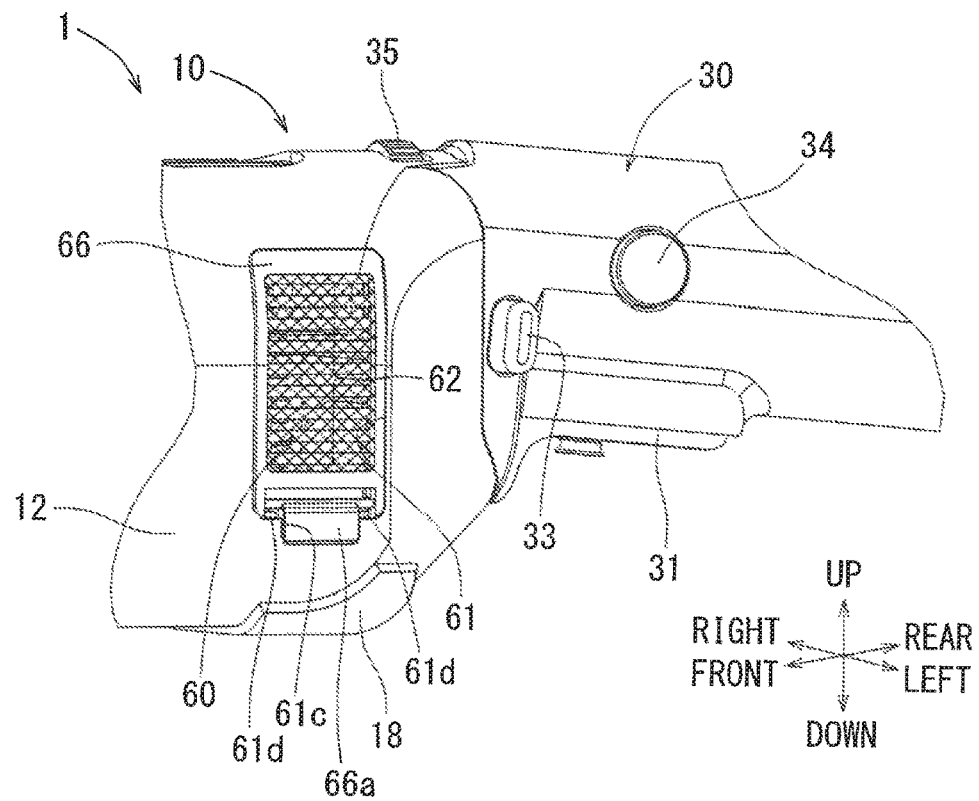
FIG. 15 is a left-side view of the electric power tool according to the second embodiment from the rear portion of the tool main body to the front portion of the grip, showing the state where the auxiliary filter is attached to the inlet port by use of the frame body having the different attaching structure of the second embodiment.
Figure 16:
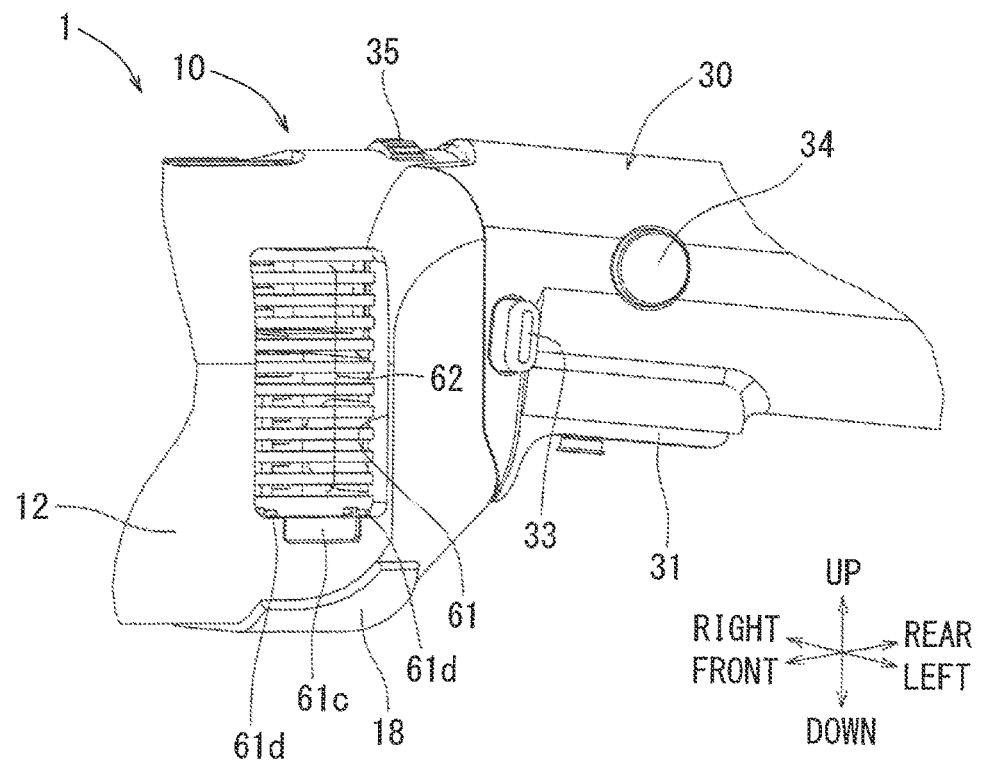
FIG. 16 is a left-side view of the electric power tool according to the second embodiment from the rear portion of the tool main body to the front portion of the grip, showing the state where the auxiliary filter and the frame body having the different attaching structure of the second embodiment are detached from the inlet port.
Figure 17:
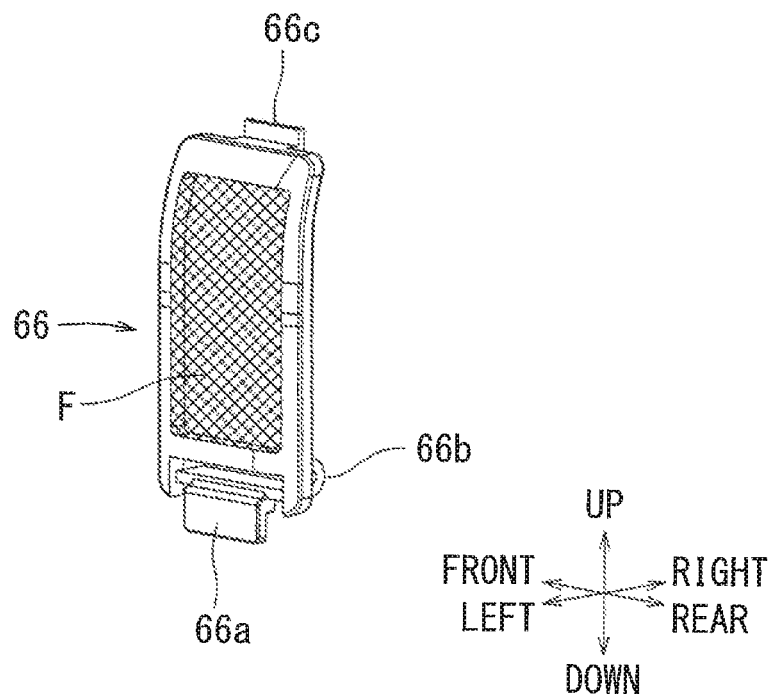
FIG. 17 is a perspective view of the frame body and the filter of the second embodiment that is detached from the inlet port, viewed from the outside.
Figure 18:
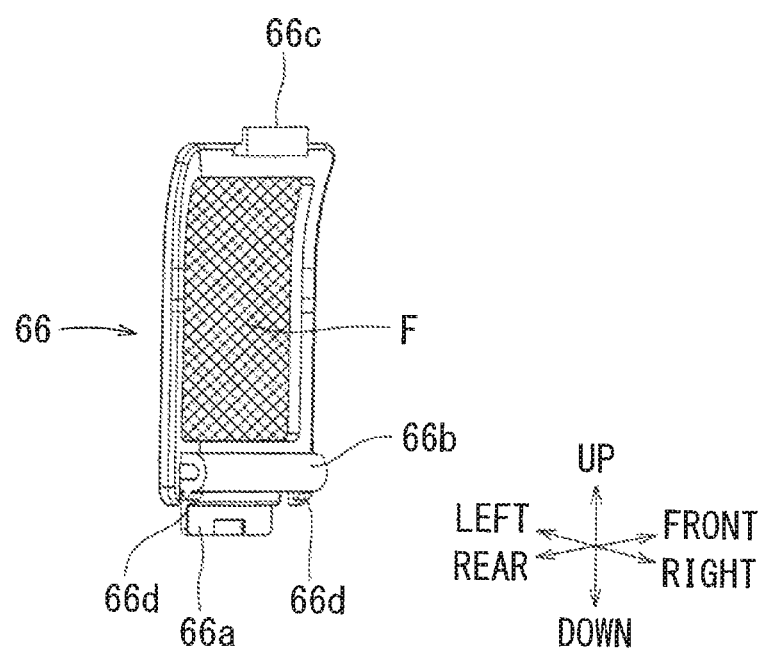
FIG. 18 is a perspective view of the frame body and the filter of the second embodiment that is detached from the inlet port, viewed from the inside.

FIG. 14 shows a state where the filter F is attached to the intake window 60 by use of a filter frame 66 of a second embodiment that has a different attaching structure from that of the filter frame 65. Similarly to the filter frame 65, the filter frame 66 may be integrally formed around the filter F. FIG. 15 shows a state where the filter F is attached to the opening 61, and FIG. 16 shows a state where the filter F is detached from the opening 61. As shown in FIGS. 17 and 18, the filter frame 66 of the second embodiment may have an approximately rectangular frame shape. An L-shaped engagement portion 66c may be provided at the upper portion of the filter frame 66 of the second embodiment, and an operation plate 66a extending downwards may be provided at the lower portion of the filter frame 66. The lock claw 65b of the first embodiment and the engagement portion 66c of the second embodiment may be formed approximately in the same L-shaped manner. However, the lower operation plate 66a may be provided at the lowest portion of the filter frame 66 via a U-shaped elastic portion 66b, which is located immediately above, and to the right of, the lower operation plate 66a, and is connected to the exterior periphery of the filter frame 66. In the second embodiment, a pair of front and rear engagement claws 66d may be provided on the front and rear ends of the lower surface of the elastic portion 66b. A pair of front and rear claw receiving portions 61d, that are complementary in shape and fitting to the engagement claws 66d may be provided at the front and rear ends of the lower portion of the opening 61.

In contrast to the filter frame 65 of the first embodiment, by first inserting the upper engagement portion 66c into the upper claw engagement portion 61b and then second by fitting the lower operation plate 66a into a shallow housing recess 61c that is provided at the lower portion of the opening 61, the pair of the engagement claws 66d provided at the lower portion of the elastic portion 66b may elastically engage with the claw receiving portions 61d on the side of the opening 61. In this way, the filter frame 66 may be in a held state where it is complementarily engaged with the opening 61.

The filter F may be attached to the opening 61 over and outward of the ventilation ribs 62 in an extended state (in a state where the opening 61 is closed) via the filter frame 66 of the second embodiment being held by elastic engagement within the opening 61. The filter frame 65 of the first embodiment may be retained in the opening 61 by use of the elastic deformation of the lock claw 65b in the up-to-down curving direction. Contrary to the filter frame 65 of the first embodiment, the filter frame 66 of the second embodiment may be held in the opening 61 by elastic engagement of the engagement claw 66d with the claw receiving portion 61d which is caused by the elastic force of the provided U-shaped elastic portion 66b. In order to detach the filter frame 66 from the opening 61, the engagement state of the engagement claw 66d with the claw receiving portion 61d may be released by the lower operation plate 66a being pushed upwards against the U-shaped elastic portion 66b, and then by moving the lower operation plate 66a leftwards (outward and towards the user relative to the opening 61 of the grille 60 on the left side of the device 1) and downwards, the engagement portion 66c can be pulled out from the claw engagement portion 61b. In this way, the filter frame 66 can be detached from the opening 61. Similar to the filter frame 65 of the first embodiment, maintenance work on the filter F can be performed by detaching the filter frame 66 from the opening 61.

According to the electric power tool 1 of the present embodiment discussed above, in a so-called angle polisher, the battery pack 50 may be attached to the upper surface side of the battery attachment portion 40 that is provided at the rear portion of the grip 30. As discussed above, in the angle polisher, the output axis P may be disposed in the up-to-down direction at the front portion of the tool main body 10 that houses the electric motor 11 such that the axis P intersects and is orthogonal to the motor axis J of the electric motor 11, and the output shaft 24 to which the tip end tool 2 is attached may be provided at the lower portion of the output portion 20, which is at the front portion of tool main body 10. Because of this configuration, in a working posture held by the user where the tip end tool 2 is directed toward the working surface W, the battery pack 50 does not directly come into contact the working surface W, thereby preventing occurrence of troubles such as, for example, the formation of unintended flaws or scratches on the working surface W.

Furthermore, the battery pack 50 may be attached to the battery attachment portion 40 such that its thickness direction (the shortest dimension of the parallelepiped shape) is aligned with the up-to-down vertical direction, and such that the connection portion 51 of the battery pack 50 faces downward with respect to the upper peripheral surface of the battery attachment portion 40. Because of this configuration, the battery pack 50 may be attached to the battery attachment portion 40 such that the upward protruding length of the battery pack 50 is configured to be the shortest. Because the upward protruding length of the battery pack 50 is minimized in this manner, when the user holds the grip 30 while stretching their hand above the battery pack 50, it is not necessary for the user to worry about inadvertently contacting or hitting the battery pack 50 with their hand. Thus, this enables the user to easily perform a wide range of polishing work by being able to stretch their hand in the forward direction above the battery pack 50. In this respect, maneuverability and ease of use of the electric power tool 1 is improved.

Furthermore, according to the exemplified electric power tool 1, the entire outer peripheral circumference of the ovular lower surface of the battery attachment portion 40 (the side of the working surface W) may be covered with the elastic resin layers 45 made of elastomer rubber. Because of the presence of the elastic resin layer 45, any adverse impact may be reduced and/or avoided when the battery attachment portion 40 contacts the working surface W, and also due to the surface characteristics of the elastomer rubber, the formation of flaws or scratches on the working surface W may be prevented.

Furthermore, as described above the lower peripheral surface of the tool main body 10 may also be covered with the elastic resin layers 18 made of elastomer resin as the elastic member, thereby furthermore preventing formation of flaws or scratches on the working surface W upon contact with said working surface W.

It is noted that the present teachings are not limited to the above-described embodiments, and it is understood that variations and modifications may be effected without departing from the spirit and scope of the present teachings. In the present embodiment, the battery pack 50 may be attached to the battery attachment portion 40 such that its thickness direction (the shortest dimension of the parallelepiped shape) is aligned with the up-to-down direction. However, the battery pack 40 may be attached to the upper surface of the battery attachment portion 40 such that its longitudinal direction is aligned with the up-to-down direction instead (the battery pack 40 is in an erected state, with its longest dimension aligned with the vertical up-to-down direction). Even if the battery pack 40 is disposed in the erected state, because the battery pack 40 is attached to the upper surface of the battery attachment portion 40, direct contact of the battery pack 40 with the working surface W is prevented, thereby preventing the formation of flaws or scratches on the working surface W.

Furthermore, in the present embodiment, the rechargeable polisher may be exemplified as the angle electric power tool 1. However, the exemplified arrangement configuration of the battery pack can be applied to other angle electric power tools such as, for example, an impact driver, a grinder, a so-called multi tool, etc. Especially, it may be sometimes necessary for the user to stretch the hand while using the tool, and thus with this paradigm of engagement the other mentioned applied electric power tools may also become useful for the user as well.

Furthermore, as an alternative to the angle polisher in which the motor shaft is perpendicular to the output shaft as discussed in the above embodiment, the rechargeable polisher may also be of a so-called vertical type, in which the motor shaft is parallel to the output shaft. In this type of polisher, the total length of the tool body may become short in the front-to-rear direction, thereby improving operability in certain spaces. Regarding a movement of the output shaft, a so-called rotary movement other than the orbital movement discussed above may be applied to the tools.

Furthermore, in the present embodiment, the battery pack 50 may be attached/detached in the front-to-rear direction. However, in an alternative embodiment, the battery pack 50 may be attached/detached in the left-to-right direction. Furthermore, in the present embodiment, one battery pack 50 may be attached to the upper surface of the battery attachment portion 40. However, in an alternative embodiment, the electric power tool may be configured such that a plurality of battery packs are attached to the battery attachment portion. In said case, where a plurality of battery packs are attached to the battery attachment portion, it may be desirable that the battery packs are attached/detached in the left-to-rear direction.

Furthermore, in the present embodiment, the slide-attachment-type battery pack 50 may have an approximately rectangular box shape with six faces, and may have rail receiving portions 52 for slidably guiding the rails and have terminal receiving portions 53 and 54 on one face (the bottom basal surface of connection portion 51). However, other attachment interfaces of battery packs may be used. For example, a battery pack may be an insertion attachment type battery pack, which may have a rectangular box shape with six faces and also may have a bar-shaped insertion portion on one face. Alternatively, a battery pack may be an insertion attachment type battery pack, which may have a bar shape such that the whole body thereof can be inserted into the electric power tool.

Furthermore, in the present embodiment, the electric power tool may be operated by DC power such as the battery pack. However, as an alternative, the present embodiment can be applied to an electric power tool that is operated by AC power, such as mains power, which may be supplied through a power cord disposed at the rear portion of the grip. Similarly to the electric power tool operated by DC power, the elastic resin layers 21c, 21d, 21e, 18, 36a for preventing flaws and scratches may be provided on the electric power tool operated by AC power.

What is claimed is:

1. An electric power tool comprising:
a tool main body housing an electric motor in a main body housing, the main body housing having a longitudinal axis;
an output shaft protruding from a lower portion of the tool main body and extending in an up-to-down direction;
a battery attachment portion disposed at a rear portion of the tool main body, the battery attachment portion having a flat plate shape that extends in directions (1) parallel to and below the longitudinal axis and (2) perpendicular to the longitudinal axis and the up-to-down direction; and
a slide-attachment type battery pack configured to supply power to the electric motor, the battery pack being configured to be attached to the battery attachment portion by sliding the battery pack in a forward direction along the longitudinal axis of the main body housing such that an entirety of the battery pack is above the battery attachment portion in the up-to-down direction.

2. The electric power tool according to claim 1, wherein:
the battery pack includes a terminal receiving portion; and
the battery attachment portion includes a terminal extending along the longitudinal axis of the main body housing, the terminal being configured to be received by the terminal receiving portion of the battery pack.

3. The electric power tool according to claim 1, wherein:
the rear portion of the tool main body includes a vertical wall adjacent the battery attachment portion; and
an upper end of the vertical wall protrudes upward higher than the upper surface of the battery pack when the battery pack is attached to the battery attachment portion.

4. The electric power tool according to claim 3, wherein an elastic member is disposed on and covers the upper end of the vertical wall.

5. The electric power tool according to claim 1, further comprising a leg formed at a top of the main body housing separate from a grip of the electronic power tool, the leg being made of an elastic member and configured such that the battery pack maintains separation from a working surface by the leg.

6. The electric power tool according to claim 1, wherein a lowermost surface of the battery attachment portion is lower than a lowermost surface of the battery pack.

7. The electric power tool according to claim 1, wherein:
the rear portion of the tool main body includes a vertical wall in the up-to-down direction;
the battery attachment portion extends rearwardly from a lower edge of the vertical wall; and
the vertical wall extends above an uppermost surface of the battery pack.

8. The electric power tool according to claim 1, wherein the battery pack includes a lock release button on a lower side of the battery pack in the up-to-down direction when the battery pack is attached to the battery attachment portion.

9. The electric power tool according to claim 8, wherein the lock release button is configured to be moved in an upward direction to permit disengagement of the battery pack from the battery attachment portion.

10. An electric polisher comprising:
a tool main body housing an electric motor in a main body housing, the main body housing having a longitudinal axis;
an output shaft protruding from a lower portion of the tool main body and extending in an up-to-down direction;
a grip extending from the main body housing;
a battery attachment portion configured to attach to a slide-attachment type battery pack that supplies power to the electric motor, the battery attachment portion having a flat plate shape that extends in directions (1) parallel to and below the longitudinal axis and (2) perpendicular to the longitudinal axis and the up-to-down direction and being disposed at the rear portion of the grip, the battery pack being configured to be attached to an upper surface of the battery attachment portion-by sliding the battery pack in a forward direction along the longitudinal axis of the main body housing; and
an elastic member fixed on a lower surface of the battery attachment portion.

11. The electric polisher according to claim 10, wherein the electric motor is a brushless motor including a cylindrically shaped stator fixed to the main body housing and a rotor rotatably supported on the inner circumferential periphery of the stator via a motor shaft, the motor shaft being orthogonal to the output shaft.

12. The electric polisher according to claim 11, wherein:
the motor shaft is rotatably supported by a front bearing and rear bearing at a front region of the motor shaft, and at a rear region of the motor shaft, respectively, and
the longitudinal axis of the motor shaft is parallel to the longitudinal axis of the main body housing, and the tool main body is formed in a tubular shape.

13. The electric polisher according to claim 12, further comprising a cooling fan disposed at the front region of the motor shaft and rearward of the front bearing with respect to the longitudinal axis of the main body housing, the cooling fan fully surrounding the motor shaft and fitted onto the motor shaft.

14. The electric polisher according to claim 12, further comprising a drive-side bevel gear fitted to a front-most region of the motor shaft immediately in front of, and adjacent to, the front bearing, the drive-side bevel gear fully surrounding the motor shaft.

15. The electric polisher according to claim 14, further comprising a driven-side bevel gear fitted to the output shaft, the driven-side bevel gear fully surrounding the upper region of the output shaft except at an uppermost end of the output shaft.

16. The electric polisher according to claim 15, wherein:
the driven-side bevel gear is disposed in front of and lower than the drive-side bevel gear with respect to the forward direction along the longitudinal axis of the main body housing,
the driven-side gear and the drive-side gear are perpendicularly adjacent to each other such that the driven-side gear and the drive-side gear are enmeshed and enable a driving action from the motor shaft to the output shaft, and
wherein the output shaft is configured to rotate by the drive-side bevel gear complementarily engaging the driven-side bevel gear.

17. The electric polisher according to claim 16, wherein the output shaft is configured to rotate about an output longitudinal axis due to the driving action of the motor shaft.

18. The electric polisher according to claim 16, wherein an eccentric shaft is integrally formed with the output shaft, the eccentric shaft extending downward from the lower surface of the output shaft such that a longitudinal axis of the eccentric shaft is disposed parallel to and spaced apart from an output longitudinal axis of the output shaft by a predetermined distance in the radial direction.

19. The electric polisher according to claim 18, wherein a lower portion of the tool main body surrounds the eccentric shaft and includes a cylindrical-shaped moving main body, the moving main body including engagement teeth on an outer peripheral circumference and a cylindrically shaped dependent body, the moving main body being configured to rotate within the dependent body.

20. The electric polisher according to claim 19, wherein a diameter of the dependent body is greater than a diameter of the moving main body, the moving main body protruding lower than the dependent body with respect to a vertical direction of the electric polisher such that a lower end of the moving main body forms a tip end at a lowest point of the output shaft.

21. The electric polisher according to claim 19, wherein the dependent body is selectively locked or unlocked such that the moving main body is configured to rotate (i) around the longitudinal axis of the output shaft, or (ii) around the longitudinal axis of the output shaft and about the eccentric shaft so as to change a position of the moving main body with respect to the dependent body.

22. The electric polisher according to claim 10, wherein the battery pack includes a lock release button on a lower side of the battery pack in the up-to-down direction when the battery pack is attached to the battery attachment portion.

23. The electric polisher according to claim 22, wherein the lock release button is configured to be moved in an upward direction to permit disengagement of the battery pack from the battery attachment portion.

24. An electric polisher comprising:
an electric brushless motor including a motor shaft having a front-to-rear axis;
a main body housing that houses the electric brushless motor extending along the front-to-rear axis;
a grip extending from a rear portion of the main body housing;
a switch lever disposed at a front portion of the grip and configured to operate the electric brushless motor;
a speed adjustment dial disposed on a front side of the switch lever and configured to adjust a rotation number of the electric brushless motor;
a battery attachment portion extending from a rear portion of the grip, the rear portion including a vertical wall adjacent to the battery attachment portion;
an output shaft having an up-to-down axis;
a battery pack configured to be attached to the battery attachment portion by sliding the battery pack in a forward direction along the front-to-rear axis above the battery attachment portion;
a gear housing disposed on a front side of the main body housing;
an intake window disposed on a front side of the switch lever;
a filter covering the intake window; and
elastic resin covering and in contact with an uppermost portion of the vertical wall and a lowermost surface of the battery attachment portion in directions parallel to the up-to-down axis without covering exposed surfaces of the battery pack when the battery pack is attached to the battery attachment portion.

25. An electric power tool comprising:
a motor shaft extending in a front-to-rear direction;
an output shaft extending in an up-to-down direction and driven by the motor shaft;
a tip end tool held by the output shaft and extending in the front-to-rear direction;
a gear housing holding the output shaft;
a main body housing holding the motor shaft and connected to a rear portion of the gear housing;
an intake window in a rear portion of the main body housing;
a grip behind the intake window and thinner than the main body housing;
a switch main body in the grip;
a switch lever below the switch main body and exposed outside the grip;
a battery attachment portion (i) behind the grip and (ii) including a first portion extending in the up-to-down direction and a second portion extending from a lower portion of the first portion in a rear direction, the first portion and the second portion forming approximately an L shape when viewed from a left-to-right direction;
at least two terminals extending in the front-to-rear direction and a groove disposed on a rear side of the at least two terminals, the at least two terminals and the groove being disposed on an upper surface of the second portion; and
a battery pack attached to the battery attachment portion and including a claw engageable with the groove.

* * * * *